M. B. SKINNER.
VALVE RESEATING TOOL.
APPLICATION FILED APR. 22, 1920.

1,425,611.

Patented Aug. 15, 1922.

Witness:
Dav. E. S. Magnusson.

Inventor:
Mortimer B. Skinner
By Luther Johns
Atty.

UNITED STATES PATENT OFFICE.

MORTIMER B. SKINNER, OF WILMETTE, ILLINOIS.

VALVE-RESEATING TOOL.

1,425,611.  Specification of Letters Patent.  Patented Aug. 15, 1922.

Application filed April 22, 1920. Serial No. 375,721.

*To all whom it may concern:*

Be it known that I, MORTIMER B. SKINNER, a citizen of the United States, and a resident of Wilmette, in the county of Cook and State of Illinois, have invented certain new and useful Improvements in Valve-Reseating Tools, of which the following is a specification.

My invention relates to tools for resurfacing the seats of valves, such as faucets, in which there is an opening for valve stem connections in lines leading directly to the seat. In the parlance of the trade the present device is called a bibb reseating tool.

The objects of the invention are to provide a simple, relatively cheap, strong and durable tool of the class described whereby the operator may expeditiously resurface the valve seat by a hand operation, and obtain accurate results through a positive feed construction; and also to provide a feature of adjustability in such a device adapting the tool to its work on bibbs or valves of various proportions. Other objects and advantages will appear hereinafter.

In the accompanying drawings, which form a part of this specification, Figure 1 is a fragmentary side elevation of a valve with the reseating tool operatively in association therewith, parts being broken away to show interior construction;

Figure 1:
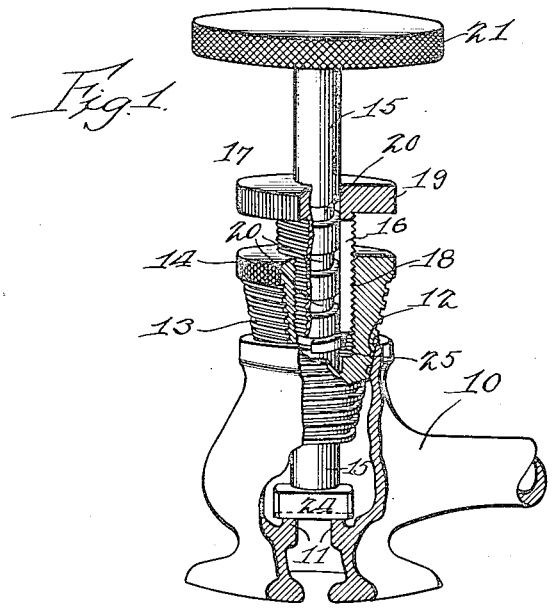
Figure 2:
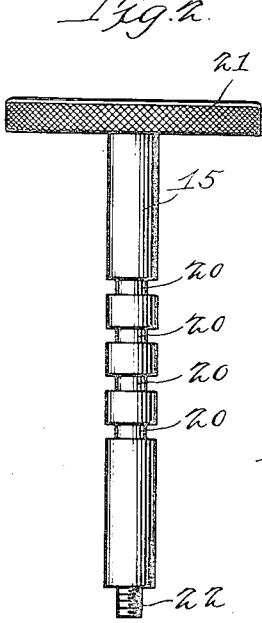
Fig. 2 is a view of the operating shaft and hand wheel.
Figure 3:
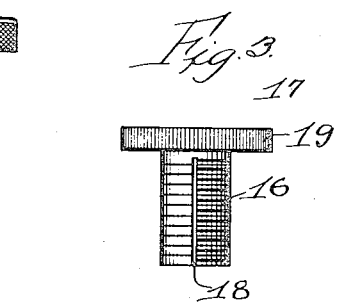
Fig. 3 illustrates the screw feed device, the threads being shown in conventional form.
Figure 4:
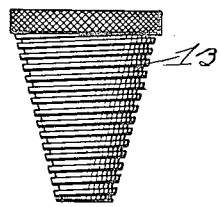
Fig. 4 shows the anchoring element.
Figure 5:
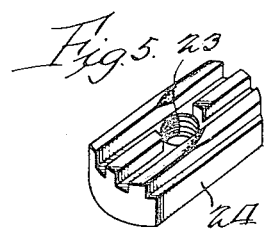
Fig. 5 is a perspective of the cutter, showing the teeth.
Figure 6:
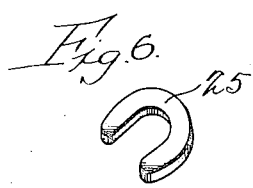
Fig. 6 is a perspective of the removable stop. The views of Figs. 5 and 6 are on an enlarged scale.

The bibb or valve 10 has an annular projection at 11, the edge surface of which constitutes the valve seat which it is desired to resurface from time to time. The valve has a relatively large circular threaded opening at 12 into which is normally threaded the valve-stem-holding parts including the packing gland when the valve is in condition for use. The plug or anchoring element 13 has a hand grasp 14 at its top, and it tapers downwardly as shown, being frusto-conical in shape, so that it will engage the threads in the opening 12 in larger and smaller valves. It is only necessary that the threads on the anchoring device 13 catch into one or two threads in the hole 12 to hold it securely in position.

This plug or anchor 13 may be made of cast iron or any other suitable metal. It is bored with an axial hole just large enough at the lower and smaller end of the plug to accommodate for easy rotating movement therein the lower end portions of the operating shaft 15, but throughout a considerable part of the plug 13 this axial hole is enlarged to accommodate the threaded stem portion 16 of the screw feed device 17, and this enlarged opening is threaded at 18 to engage the threads of the member 16.

The threaded stem 16 is preferably cross-sawed on diagonal lines as at 18 to give a spring effect to the stem 16 in order to provide a snug fit of the threads while insuring its easy relative movement when the feed feature is being employed. For rotating the stem 16 I provide a knurled finger disc 19 integral therewith. The feed device 17 may well be of brass.

The iron or steel operating shaft 15 is provided with a plurality of annular grooves 20, four thereof being shown in the device of the drawings. A knurled hand wheel 21 rigid with the shaft constitutes means for rotating the shaft by hand. The lower end of the shaft 15 is reduced in diameter and threaded to provide the extension 22, which threads into the hole 23 in the cutter 24, the threads at 22 being right hand threads and the teeth of the cutter being adapted to cut when rotated in the clock-wise direction when viewed from the top as positioned in Fig. 1, and they engage the annular surface on the seat at 11.

The substantially U-shaped stop element 25 fits into the grooves 20 with portions of the stop extending outwardly beyond the surface of the shaft, and, as seen in Fig. 1, the stop 25 engages the lower end of the feed stem 16. The resistance to cutting tends to force the operating shaft 15 away from the seat ring 11, but the stop 25 holds the cutter there. When the feed stem 16 is rotated so as to push the stop 25, and with it the operating shaft 15 downward so that the teeth of the cutter engage the seat ring at 11, a turn of the operating wheel 21 in the clock-wise direction causes chips to be cut from the seat at 11, at the high places thereof, whereupon by turning the stem 16 further by means of the finger wheel 19 the teeth are again brought down upon the seat, and additional rotation of the operating shaft cuts away further chips until the shaft runs free again. By successively feeding the cutter into the work and turning the hand wheel 21 in the cutting direction a smooth and even surface is produced upon the seat.

In practice the operator holds the valve in one hand and turns the wheel 21 with the other, and with the thumb and finger of the holding hand he can feed the cutter little by little as desired while continuing to rotate the operating shaft.

In case the valve to be reseated is of larger proportions, in which case the distance from the valve seat to the opening 12 is greater, the stop 25 is inserted in one of the other annular recesses 20. The distance between the several adjacent grooves 20 is relatively small compared with the length of the stem 16 so that it is possible to use the device in a large number of different sizes of valves.

After the cutter 24 has done all of the work required of it the plug 13 may be unscrewed and a piece of fine emery paper may be laid upon the valve seat and the tool parts replaced in operative position as before, whereupon several turns of the operating shaft will cause the emery paper to produce a still smoother surface upon the seat.

I contemplate as being within the scope of these improvements such modifications of the illustrated device as are included in the appended claims.

I claim:

1. In a valve reseating tool of the class described the combination of a cutter, a shaft on which the cutter is mounted, means for rotating the shaft by hand, a feed stem through which the shaft extends rotatably, screw threads externally on said stem, a conical anchoring element having external threads adapted to engage with threads in the opening of the valve normally holding the valve-stem-holding parts, said anchoring element having an axial hole threaded to engage the threads of said stem, the stem being threaded into said anchoring element, stop means on said shaft against which said stem bears to hold the cutter against the seat to be surfaced, and means for turning said stem by hand on its axis to feed the cutter into the seat.

2. In a valve reseating tool of the class described the combination of a cutter, a shaft on which the cutter is mounted, means for rotating the shaft by hand, a feed stem through which the shaft extends rotatably, screw threads externally on said stem, an anchoring element for holding the stem and shaft in operative position in the opening of the valve normally covered by the valve-stem-holding parts, said anchoring element having a conical outer threaded surface for engaging threads in said valve opening and having an axial hole threaded to engage the threads of said stem, the stem being threaded into said anchoring element, an adjustable stop on said shaft against which said stem bears to hold the cutter against the seat to be surfaced, and means for turning said stem by hand on its axis to feed the cutter into the seat.

3. In a valve reseating tool of the class described the combination of a cutter, a shaft on which the cutter is mounted, means for rotating the shaft by hand, a feed stem through which the shaft extends rotatably, screw threads externally on said stem, an anchoring element for holding the stem and shaft in operative position in the opening of the valve normally covered by the valve-stem-holding parts, said anchoring element having an axial hole threaded to engage the threads of said stem, said shaft having a plurality of annular grooves therein any one of which may hold a stop element effectively between the stem and the cutter, and a readily removable stop element adapted to fit in any one of said grooves against which said stem bears to hold the cutter against the seat to be surfaced, and means for turning said stem by hand on its axis to feed the cutter into the seat.

MORTIMER B. SKINNER.